INVENTOR
SHOZO SATO
YOSHIHISA OTAKA
YUKIO TAKIGAWA
BY
ATTORNEYS

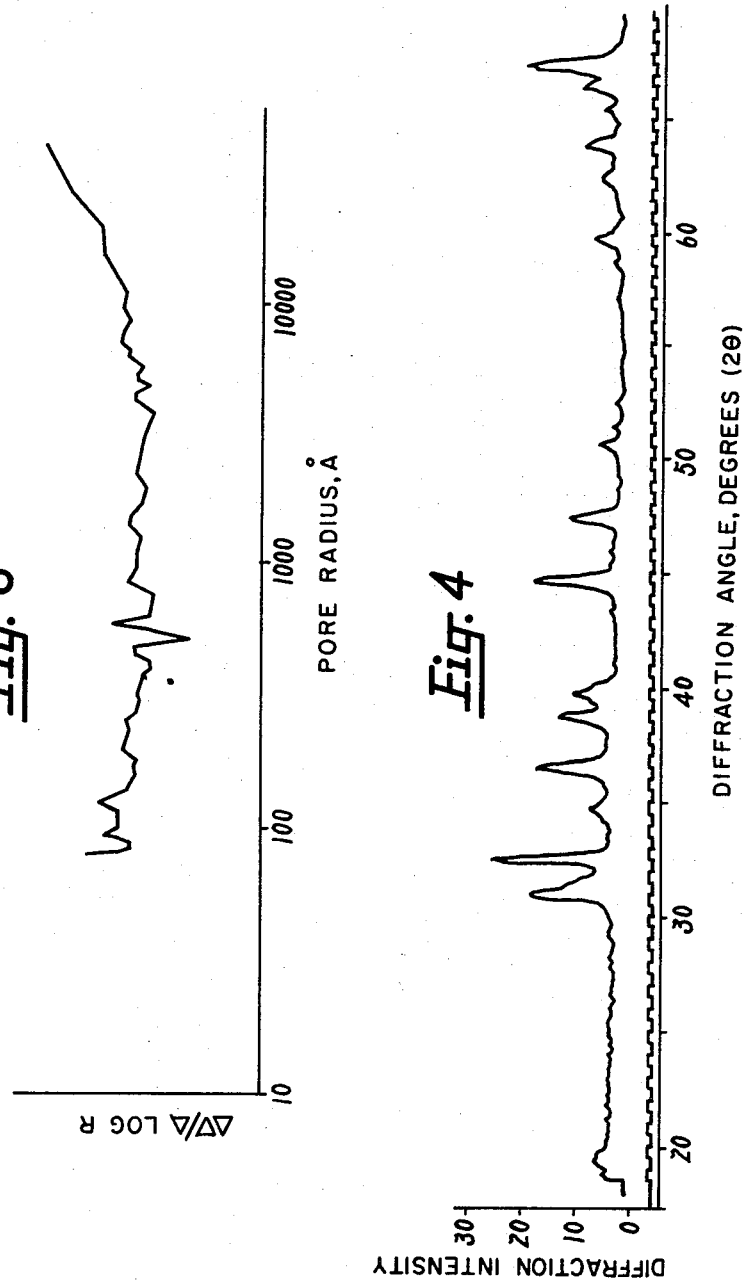

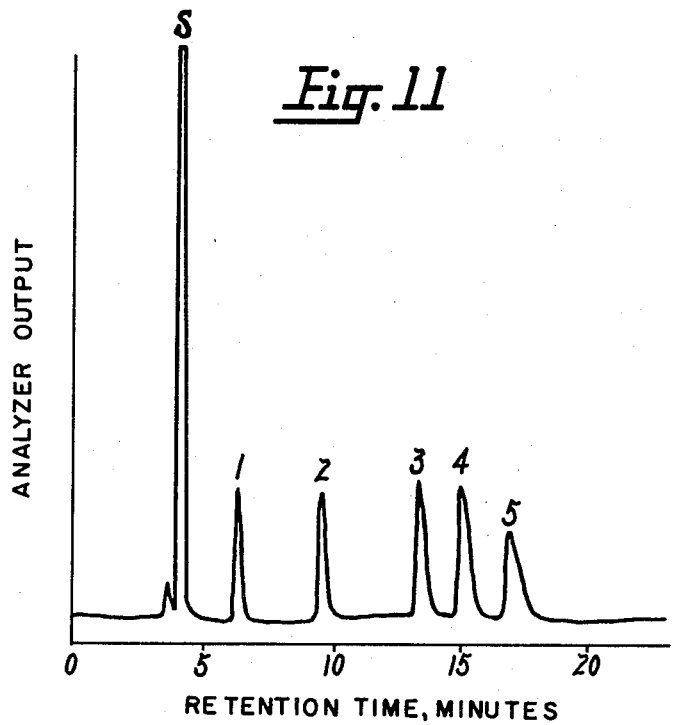
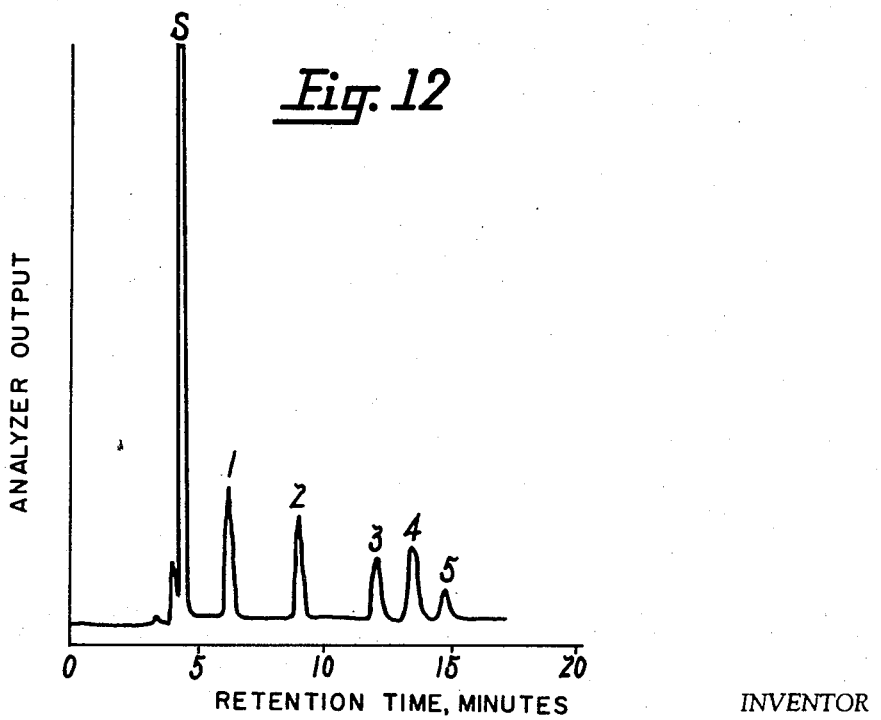

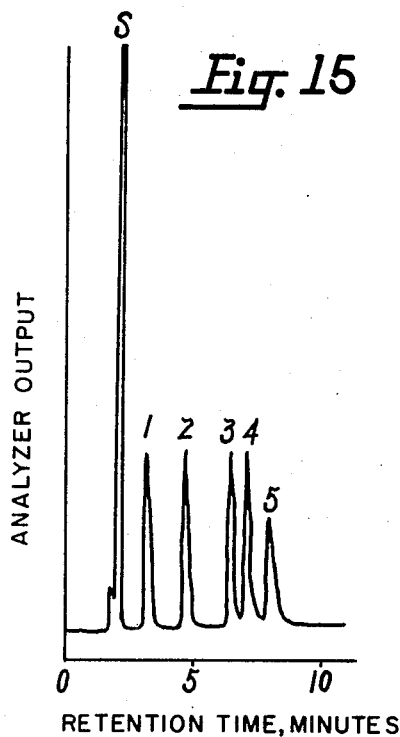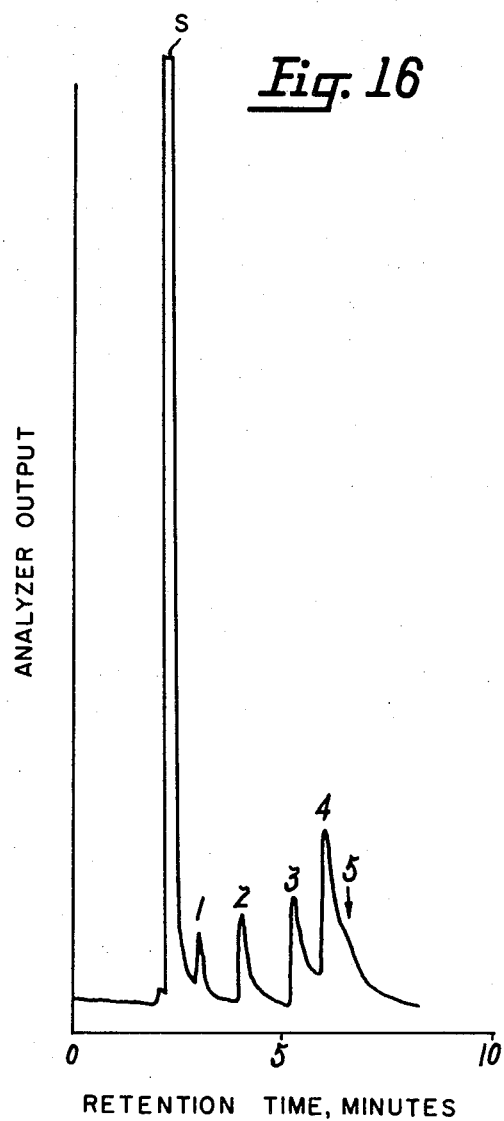

United States Patent Office 3,714,343
Patented Jan. 30, 1973

3,714,343
ALUMINA HYDRATE, θ-ALUMINA AND A METHOD FOR THE MANUFACTURE THEREOF
Shozo Sato and Yoshihisa Otaka, Tokyo, and Yukio Takigawa, Kawasaki-shi, Japan, assignors to Mitsubishi Chemical Industries Limited, Tokyo, Japan
Filed June 24, 1968, Ser. No. 739,240
Claims priority, application Japan, June 26, 1967, 42/40,470; July 24, 1967, 42/47,344; Dec. 18, 1967, 42/80,806
Int. Cl. C01f 7/02, 7/34
U.S. Cl. 423—628
9 Claims

ABSTRACT OF THE DISCLOSURE

A pure alumina hydrate, having uniform pores, is manufactured from an aluminum salt of a monobasic acid and in the presence of an acid carbonate. Calcination of this pure alumina hydrate produces a pure θ-alumina having uniform pores. This θ-alumina may be used as an adsorbent in gas chromatography.

---

The invention relates to a specific alumina hydrate, that is, boehmite and θ-alumina produced by the calcination of boehmite and to a process for the manufacture of such alumina hydrates. The invention also relates to the use of said θ-alumina. More particularly, the invention relates to a boehmite having high purity and uniform pores, a θ-alumina having uniform pores produced by the calcination of such boehmite, and a method for the manufacture thereof. Further, the invention contemplates the utilization of said θ-alumina as an adsorbent in gas chromatography.

A number of prior art methods, as for example the Bayer process, are known for the manufacture of alumina hydrate. However, it is impossible to produce an alumina hydrate having pores of a large radius and a narrow pore size distribution with these known processes. Further, with the use of these known methods, it is difficult to produce an alumina hydrate which is substantially free of impurities. It is also difficult to produce by calcination of alumina hydrate a high purity θ-alumina which has uniform pores.

An object of the present invention is to provide a high purity boehmite having a uniform pore radius, and a method for the manufacture of such boehmite.

Another object of the invention is to provide a high purity θ-alumina, having a uniform pore radius, by the calcination of a high purity alumina hydrate having a uniform pore radius, and a method for the manufacture of such θ-alumina.

A further object of the invention is to provide for the utilization of said θ-alumina as an adsorbent in gas chromatography.

Other objects, features and advantages of the invention will be apparent as the disclosure of the invention progresses. Reference is made to the attached drawings in which:

FIG. 3 is an example of the pore size distribution chart of an alumina hydrate obtained by the method of the invention but with elimination of the aging process;

FIG. 4 shows an example of the X-ray diffraction pattern of θ-alumina produced by the method of the invention;

FIGS. 10 to 15 show a gas chromatogram obtained when θ-alumina produced by the method of the invention was used as the adsorbent; and FIG. 16 shows a gas chromatogram obtained wherein α-alumina was used as the adsorbent.

Figure 1:
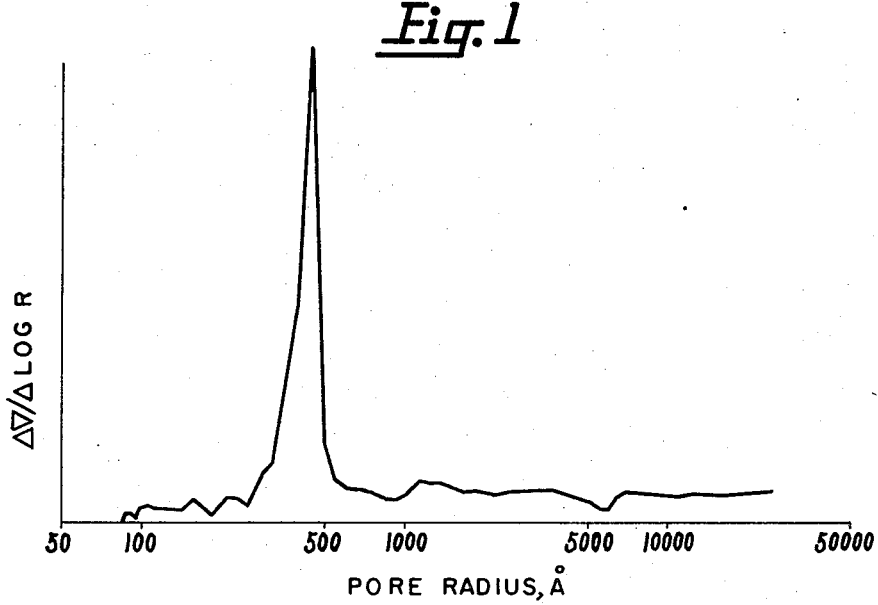
FIGS. 1 and 2 are examples of the pore size distribution chart of a boehmite manufactured in accordance with the invention.

In FIGS. 1, 2, 3, 5, 7 and 8, the ordinate distribution function $\Delta V/\Delta \log R$ is obtained by numerically differentiating the cumulative pore volume V with log of pore radius R.

According to the invention, an aluminum salt of a monobasic acid is employed as the starting material. The employment of other aluminum compounds such as aluminum sulfate results in an alumina hydrate which contains basic aluminum salt, for example, aluminum sulfate. The basic aluminum sulfate coprecipitates with sulfate ion in solution and thereby prevents the removal of acid ion during aging, and consequently prevents the obtaining of pure boehmite.

Preferred aluminum salts of monobasic acids employed in the method of the invention are aluminum nitrate and aluminum chloride. However, other types of monobasic acid salts may be utilized.

The precipitant for use in the production of alumina hydrate from a solution of such monobasic acid salt should be an acid carbonate. The employment of other kinds of precipitants such as sodium carbonate or ammonia results in a reaction solution which is locally alkaline, and the alumina hydrate which is produced will contain alkaline impurities which deteriorate its quality.

Although the preferred acid carbonate for use in the method of the invention is ammonium hydrogen carbonate, other acid carbonates, for example, sodium hydrogen carbonate, may serve the same purpose. These acid carbonates are usually employed in the form of an aqueous solution.

The process for the production of alumina hydrate from an aqueous monobasic acid salt solution usually comprises adding an aqueous acid carbonate solution in an amount approximating 0.8 mol per liter to an aqueous aluminum salt solution having a concentration of about 1 mol per liter while stirring the latter at room temperature to precipitate alumina hydrate. The resulting alumina hydrate is then aged, whereby a boehmite having the desired properties is obtained. Failure to effect aging results in the production of a low purity boehmite having irregular pores.

The aging is carried out in an aqueous solution at a pH of 4.0 to 7.5, preferably 5.5 to 6.5, said pH being determined at room temperatures. The aging effect will not be adequate outside said pH range.

The aging may be effected by keeping said aqueous solution containing alumina hydrate under aging conditions. In the course of aging, acid radicals, in the form of ions, adsorbed to the alumina hydrate, tend to be liberated into the solution, thereby lowering the pH of said solution. For this reason, when an acid carbonate is added to an aqueous aluminum salt solution to form alumina hydrate and the solution is immediately aged, it is advisable to add acid carbonate upon completion of the precipitation of alumina hydrate, that is, when the maximum viscosity of reaction solution is reached by the precipitation of alumina hydrate. The acid carbonate is added in order to prevent the decrease in pH which may be caused by the liberation of acid radicals during the aging.

The aging is carried out at room temperature to 250° C., preferably from 150° to 220° C., more preferably from 160° to 210° C., for a period of 2 hours or more, preferably 5 to 50 hours.

If too low an aging temperature is employed, the growth of boehmite will be retarded and an alumina hydrate will be obtained which is substantially non-crystalline (as detected by its X-ray diffraction pattern) and has pores of a smaller radius.

On the other hand, if too high an aging temperature is used, a favorabgle aggregation of boehmite microcrystals does not occur, and the growth of individual microcrystals is not facilitated.

The calcination of a boehmite formed at too high or too low an aging temperature, results in α-alumina. No θ-alumina is produced.

The aging is usually carried out in a closed vessel which is filled with a solution of reaction product containing alumina hydrate, preferably under stirring and at a predetermined temperature. Because of the decomposition of the precipitant during the aging and the resultant evolution of carbon dioxide, the use of an autoclave is preferred. The aging is preferably carried out at a pressure of 10 to 20 kg./cm.$^2$, said pressure being determined at room temperature. The pressure is raised to said level by supplying carbon dioxide gas to the aging vessel from an exterior source.

The aging thus carried out under pressure of carbon dioxide gas results in a boehmite having pores of uniform radius and a higher porosity.

In the method according to the invention, with the suitable selection of aging conditions, it is possible to obtain a boehmite having the desired pore size, porosity, surface area, surface acid strength and the like. For example, as the aging temperature increases, the pore radius and porosity of boehmite increase, whilst the surface area and bulk density decrease and the surface acid strength approximates neutrality. However, temperatures exceeding 230° C. give rise to a decrease in the porosity and an increase in the bulk density. Further, the results obtained when the aging period is increased parallel those obtained when the temperature is increased.

After aging, the boehmite is filtered out of the aged slurry. The resulting boehmite may be used as is, or if desired refined in the following manner.

The boehmite is washed with an aqueous 1%-ammonium nitrate solution; dried to remove attached moisture; and finally, calcined at a temperature of 300°–400° C., preferably 330°–370° C., to decompose attached impurities such as ammonium nitrate whereby a refined boehmite is obtained.

The resulting boehmite has a high crystallinity, a low content of impurities, and pores of uniform radius. Accordingly, the boehmite obtained by the method in accordance with the invention may be utilized as is, or after calcination, as a catalyst carrier or a column packing material in gas chromatography.

Calcination of the thus obtained boehmite at a temperature of 1050°–1200° C., preferably 1100°–1150° C., affords a θ-alumina which is high in purity and has a uniform pore radius. The employment of a lower calcination temperature results in δ-alumina, while use of higher calcination temperature results in α-alumina. Further, the calcination temperature affects the properties of θ-alumina in that a higher calcination temperature decreases porosity and increases pore radius. The calcination is usually carried out for one hour or more, preferably 2 to 3 hours.

The θ-alumina thus obtained has a high crystallinity, a low content of impurities, and a uniform pore radius. Accordingly the θ-alumina manufactured by the method of the invention is useful as a catalyst carrier, an adsorbent in gas chromatography, and a packing material in gel permeation chromatography. It should be noted that when utilized as an adsorbent, particularly in gas-liquid chromatography, the θ-alumina exhibits excellent properties in regard to its separation and peak symmetry.

Consequently, substances having similar structures, as for example isomers of a cyclic hydrocarbon compound, may be definitely separated from each other. Further, when used as an adsorbent without tailing reducer, in gas chromatography, said θ-alumina displays an excellent capability for separation and peak symmetry. The nature of the substance to be examined may require that the θ-alumina be impregnated with a small amount of a tailing-reducer before being used as an adsorbent or fixed phase support.

Any liquid having a high boiling point may serve as said tailing reducer. Examples of such substances include silicon oil, paraffin oil, ethylene glycol, and dioctyl terephthalate. However, other esters, polyesters, amines and polyamines may serve the same purpose. The amount of tailing-reducer to be used varies and is dependent upon the kind of substance that is used as the tailing-reducer. Usually an amount of tailing-reducer of 1% or less is sufficient to effect the impregnation.

The θ-alumina may be employed as packing material in any mode known in the art, and in gas-chromatography is employed as an adsorbent in the conventional manner.

As compared with conventional adsorbents used in gas-chromatography, the θ-alumina, produced according to the invention, when used as a packing material in gas-chromatography, displays a better capability for separation and affords more symmetrical peaks. The use of said θ-alumina in the type analysis of hydrocarbons permits a good separation in the sequence of naphthene compounds, paraffin compounds, olefin compounds, and aromatic compounds which have the same carbon atoms.

Further, when the θ-alumina produced according to the invention is applied to separation of xylene-isomers, m-xylene is separated prior to p-xylene. Thus, the employment of the θ-alumina of our invention is very useful, especially when applied to an analysis of a small amount of m-xylene contained in a large amount of p-xylene. This cannot be done with conventional packing materials. Conventional packing materials exert inadequate capability of separating isomers of any type.

Some examples of the invention follow. It should be noted that a mercury porosimeter was used for the measurement of pore size distribution and porosity with regard to pores having a radius exceeding 75 A.; a sorptometer was employed for the measurement of surface area; and the Benesi method was employed for the measurement of surface acid strength of alumina hydrate.

EXAMPLE 1

As the starting material, an aqueous aluminum salt solution was prepared by dissolving 450 g. (1.2 mol) of aluminum nitrate in 1.20 l. of water. An aqueous precipitant solution was prepared by dissolving in 5.0 l. of water a sufficient quantity of commercial ammonium carbonate to bring the ammonium ion concentration to about 0.75 N; then adding a quantity of Dry Ice to the resultant solution whereby carbon dioxide gas was absorbed and the pH of said solution reached 7.5.

The aqueous precipitant solution was gradually added to the aforesaid aqueous aluminum salt solution (i.e., the starting material), while said aqueous aluminum salt solution was being vigorously agitated, whereby an alumina hydrate was formed. The ammonium ion concentration of said aqueous precipitant solution was 0.75 N. When the viscosity of the reaction solution reached a maximum and the formation of alumina hydrate was completed, an additional 200 ml. of the aqueous precipitant solution was added. The final pH of the reaction solution was 5.5, and the total consumption of the aqueous precipitant solution amounted to 4.96 liters.

The entire reaction solution including the alumina hydrate was transferred to an autoclave made of titanium. Carbon dioxide gas was then forced into the said autoclave at room temperature until 10-atmospheric pressure was reached. The reaction solution was then subjected to aging for 5 hours at 215° C. under stirring. Upon completion of the aging, the pH of the reaction solution was 6.1.

The reaction solution was filtered and the precipitate thereby removed was washed with a luke warm 0.5%-ammonium nitrate solution, dried, and then calcined at 350° C. for 4 hours whereby 68.9 g. of product were obtained. The ignition loss of said product amounted to 18.4%.

The resultant product was filtrable and was comprised of a pure white boehmite powder. Said boehmite powder had a bulk density of 0.32 g./ml., a porosity of 2.12 ml./g., a specific surface area of 32 m.$^2$/g., and a pore size distribution showing a sharp peak at a radius of 340 A. The X-ray diffraction pattern indicated a crystallite size of 350 A. for the plane (0 2 1) determined in accordance with the Scherrer's equation.

When calcined at 500° C., said boehmite was given a specific surface area of 55 m.$^2$/g. Further, when calcined at 500° C. in an argon gas stream, which had been previously dried by phosphorus pentoxide, said boehmite was given a surface acid strength Ho in the range 4.0–3.3.

EXAMPLE 2

An aqueous aluminum salt solution and an aqueous precipitant solution were prepared as described in Example 1, and the process, outlined in said example, for producing alumina hydrate was followed. The ammonium ion concentration of the aqueous precipitant solution was 0.747 N. When the viscosity of the reaction solution reached a maximum and the formation of alumina hydrate was completed, an additional 240 ml. of the precipitant solution was added. The final pH of the reaction solution was 5.75, and the total amount of aqueous precipitant solution consumed was 4.78 l.

The entire reaction solution including alumina hydrate was charged into an autoclave made of titanium. Carbon dioxide gas was forced into the autoclave at room temperatures until 10-atmospheres pressure was reached. The reaction solution was then subjected to aging for 15 hours at 210° C. under stirring. Upon completion of the aging period, the pH of the reaction solution was 6.10. The reaction solution was filtered and the precipitate thereby removed was washed with 2 l. of lukewarm 0.5%-ammonium nitrate solution, dried and then calcined at 350° C. for 4 hours whereby 68.7 g. of product were obtained. The ignition loss of said product amounted to 14.8%. In the attached drawings, FIG. 1 shows the pore size distribution chart of said product. In said figure, the abscissa indicates the pore radius (A.) and the ordinate indicates the distribution function.

The resultant product was filtrable and was comprised of a pure white boehmite powder. Said boehmite powder had a crystallite size of 427 A. for the (0 2 1) plane as determined by X-ray diffraction method and a bulk density of 0.34 g./ml. When calcined at 500° C., said boehmite was given a porosity of 1.67 ml./g., a pore size distribution showing a sharp peak at a radius of 450 A. (as is apparent by reference to FIG. 1), and a specific surface area of 66.0 m.$^2$/g. Further, when calcined at 500° C. for 1 hour in a stream of argon gas which had been previously dried by phosphorus pentoxide, said boehmite was given a surface acid strength Ho of +3.3.

EXAMPLE 3

The process for preparing alumina hydrates described in Example 1 was followed. An aqueous precipitant solution having a 0.747 N-ammonium ion concentration was employed. When the viscosity of the reaction solution reached a maximum and the formation of alumina hydrate was completed, an additional 200 ml. of the aqueous precipitant solution were added. The final pH of the reaction solution was 5.60 and the total amount of aqueous precipitant solution consumed was 4.76 liters.

Figure 2:
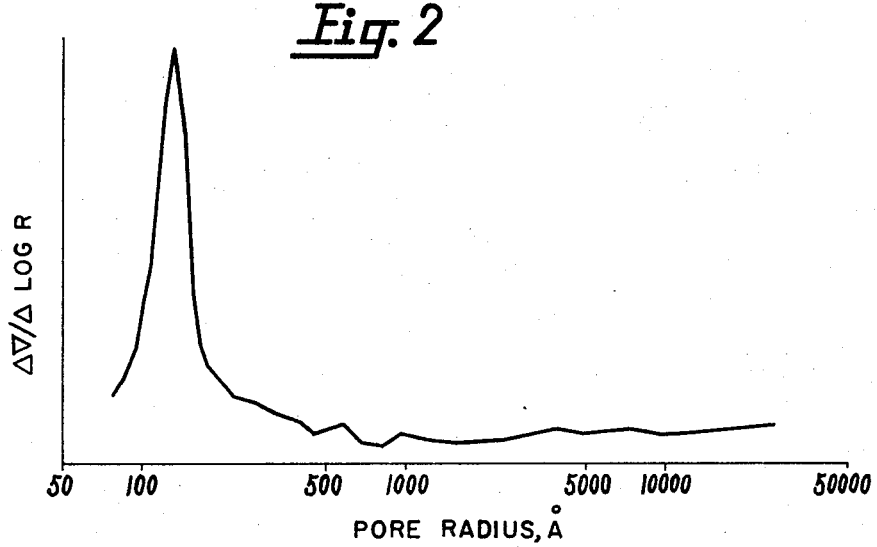

The entire reaction solution, including alumina hydrate, was transferred to an autoclave made of titanium. Carbon dioxide gas was forced into the autoclave at room temperatures until 20-atmospheres pressure was reached. Aging was carried out for 15 hours under stirring while maintaining the temperature of the solution at 170° C. Upon completion of the aging, the pH of the reaction solution was found to be 6.25. The reaction solution was filtered and the precipitate was collected, washed with 2 l. of a lukewarm 0.5%-ammonium nitrate solution, dried and then calcined at 350° C. for 4 hours whereby 66.5 g. of product were obtained. The ignition loss of said product amounted to 13.8%. FIG. 2 shows the pore-size distribution of the boehmite obtained in this example.

The resulting product was filtrable and was comprised of a pure white boehmite powder. The boehmite powder had a crystallite size of 141 A. for the (0 2 1) plane as determined by X-ray diffraction method and a bulk density of 0.64 g./ml. The calcination of said boehmite gave a product having a porosity of 1.43 ml./g., a pore-size distribution having a sharp peak at a radius of 135 A. (as shown in FIG. 2), and a specific surface area of 108.7 m.$^2$/g. Further, the calcination of said boehmite in an argon gas stream which had been previously dried with phosphorus pentoxide, at 500° C. for 1 hour gave a material having a surface acid strength Ho of −8.2.

EXAMPLE 4

The process for preparing alumina hydrate as described in Example 1 was followed. An aqueous precipitant solution having a 0.750 N-ammonium ion concentration was employed. When the viscosity of the reaction solution reached a maximum and the formation of alumina hydrate was completed, an additional 160 ml. of said precipitant solution were added.

The final pH of the reaction solution was 5.38 and the total consumption of the aqueous precipitant solution amounted to 4.75 l.

The entire reaction solution including alumina hydrate was then transferred to an autoclave made of titanium. Carbon dioxide gas was forced into the autoclave at room temperatures until 10-atmospheres pressure was reached. Aging was then carried out under stirring at 200° C. for 5 hours. Upon completion of the aging, the reaction solution indicated a pH of 5.40. The reaction solution was filtered and the precipitate was collected, washed with 2 l. of a lukewarm 0.5-ammonium nitrate solution, dried, and then calcined at 350° C. whereby 71.0 g. of product were obtained. The ignition loss of said product amounted to 18.6%.

The product was filtrable and was comprised of a pure white boehmite powder. The boehmite powder had a crystallite size of 235 A. for the (0 2 1) plane as determined by X-ray diffraction method, and a bulk density of 0.35 g./ml. When calcined at 500° C., said boehmite was given a porosity of 1.86 ml./g., a pore-size distribution showing a sharp peak at the radius of 200 A., and a specific surface area of 99.5 m.$^2$/g. Further, when subjected to calcination for 1 hour at 500° C. in an argon gas stream which had been previously dried by phosphorus pentoxide, the boehmite indicated the surface acid strength Ho of −8.2.

EXAMPLE 5

A starting aqueous aluminum salt solution was prepared by dissolving 450 g. (1.2 mol) of aluminium nitrate in 1.20 l. of water. An aqueous precipitant solution was prepared by dissolving 340 g. of sodium bicarbonate in 5.00 l. of water, then adding a quantity of Dry Ice thereto so that carbon dioxide gas was absorbed by the solution until the pH thereof reached 7.6. The sodium ion concentration of the resulting precipitant solution was found to be 0.795 N.

The precipitant solution was gradually added to the said aqueous aluminum salt solution while stirring vigorously whereby alumina hydrate was produced. After the viscosity of the reaction solution reached a maximum and the formation of alumina hydrate was completed, an additional 240 ml. of the aqueous precipitant solution were added.

The final pH of the reaction solution was found to be 5.62 and the total consumption of the aqueous precipitant solution amounted to 4.47 l.

The entire resulting reaction solution including alumina hydrate was transferred to an autoclave made of titanium. Carbon dioxide gas was forced into said autoclave until 10-atmospheres pressure was reached, and aging was carried out at 200° C. under stirring for 5 hours. When aging was completed, the pH of the reaction solution was 4.75. The reaction solution was filtered and the precipitate was collected, washed with 4 l. of a lukewarm 0.5%–ammonium nitrate solution, dried and calcined at 350° C. whereby 67.9 g. of product were obtained. The ignition loss of this product measured 15.0%.

The resultant product was filtrable, and was comprised of a pure white boehmite powder. The boehmite powder had a crystallite size of 274 A. for the (0 2 1) plane as determined by X-ray diffraction method, and a bulk density of 0.49 g./ml. said bulk density being greater than that of Example 4. Further, when the said precipitate was subjected, after aging, washing, drying, to a subsequent calcination at 250° C. a boehmite powder was produced, said boehmite powder having a porosity of 1.20 ml./g., said porosity being somewhat less than that of Example 4 and a pore-size distribution having a peak similarly at a radius of 210 A. Further, when subjected to calcination at 500° C. said precipitate was given a specific surface area of 80.0 m.$^2$/g., and contained 0.015% sodium. The calcination of the precipitate at 500° C. for 1 hour in an argon gas stream that had been previously dried with phosphorus pentoxide, gave a product having a surface acid strength Ho of −3.0 which was more neutral than that of Example 4.

EXAMPLE 6

A starting aqueous aluminum salt solution was prepared by dissolving 290 g. (1.2 mol) of aluminum chloride in 1.20 l. of water. An aqueous precipitant solution was prepared by dissolving 176 g. of commercial ammonium carbonate in 5.00 l. of water and then adding thereto a quantity of Dry Ice for absorption of carbon dioxide gas until the pH of the aqueous solution reached 7.5. The ammonium ion concentration of this aqueous precipitant solution was 0.773 N. The aqueous precipitant solution was gradually added to the starting aqueous aluminum salt solution under stirring to prepare alumina hydrate. An additional 260 ml. of the precipitant solution were added when the reaction solution reached maximum viscosity and the formation of alumina hydrate was complete.

The final pH of the reaction solution was 5.68 and the total amount of precipitant solution consumed was 4.62 l.

The entire resulting reaction solution including alumina hydrate was transferred to an autoclave made of titanium. Carbon dioxide gas was forced into the autoclave until 10-atmospheres pressure was reached, and aging was carried out for 15 hours at 240° C. under stirring. The pH of the reaction solution subjected to the aging was 6.95. The reaction solution was then filtered. The filtered precipitates were washed with 2 l. of a lukewarm 0.5%–ammonium nitrate solution, dried, and then calcined at 350° C. for 4 hours whereby 66.6 g. of product were obtained. The ignition loss of the product amounted to 15.4%.

The product was comprised of pure white boehmite powder. The boehmite powder was filtrable as a whole, but contained some particles which passed through the filter. The boehmite had a crystallite size of 690 A. for the (0 2 1) plane as determined by X-ray diffraction method and a bulk density of 0.58 g./ml. Calcination of the boehmite at 500° C. produced a product having a porosity of 1.01 ml./g., a pore-size distribution having a sharp peak at the radius of 790 A., and a specific surface area of 33.8 m.$^2$/g. Products produced by calcination of the boehmite at 350° C. and 500° C. respectively contained chlorine in an amount less than 0.01%. The product produced by calcination of the boehmite at 500° C. for 1 hour in a stream of argon gas which was previously dried with phosphorus pentoxide, had a surface acid strength Ho of −3.0.

COMPARATIVE EXAMPLE 1

Alumina hydrate was prepared by the process described in Example 5. However, no aging was carried out.

The resultant product had a bulk density of 0.95 g./ml., a specific surface area of 244 m.$^2$/g., and a surface acid strength Ho less than −8.2. Its pore-size distribution as is apparent from FIG. 3, showed no peaks at specific points; this indicates that the pores were irregular in dimension. Thus, the product obtained without aging showed irregular pores, a stronger surface acid strength and contained a residue acid radical as impurity.

EXAMPLE 7

450 g. (1.2 mol) of aluminum nitrate were dissolved in 1.20 l. of water in order to prepare a starting aqueous aluminum salt solution. An aqueous precipitant solution having a 0.773 N-ammonium ion concentration was prepared by dissolving 176 g. of commercial ammonium carbonate in 5.0 l. of water, adding a quantity of Dry Ice thereto until the pH of the solution reached 7.5 due to the absorption of carbon dioxide gas by the solution.

This precipitant solution was gradually added to the starting aqueous aluminum salt solution under vigorous stirring to produce alumina hydrate. An additional 210 ml. of the precipitant solution were added when the reaction solution reached maximum viscosity and the formation of alumina hydrate was completed. The final pH of the reaction solution was 5.50 and the total amount of aqueous precipitant solution consumed was 4.59 l.

The entire reaction solution including alumina hydrate was then transferred to an autoclave made of titanium. Carbon dioxide gas was forced into the autoclave until 10-atmospheres pressure was reached. The aging was carried out under stirring at 210° C. for 15 hours. The pH of the resulting reaction solution was 5.70.

After the aging was completed, the precipitates were filtered from the reaction solution, washed with 2 l. of a lukewarm 0.5%-ammonium nitrate solution, dried and then calcined at 350° C. for 4 hours whereby 68.7 g. of a boehmite were obtained.

The resulting boehmite was subjected to calcination for 2.5 hours at the temperatures shown in the following table:

temperature outside said range results in the production of α-alumina.

TABLE 1

| | Calcination temperature, °C. | | | | | |
|---|---|---|---|---|---|---|
| | 1,000 | 1,100 | 1,150 | 1,200 | 1,250 | 1,300 |
| Crystal form | δ— | θ—>>δ— | θ— | θ—, α— | α—>>θ— | α— |
| Bulk density, g./ml | 0.39 | | 0.47 | 0.53 | 0.60 | 0.65 |
| Specific surface area m.²/g | 25.5 | 27.1 | 30.4 | 21.9 | 7.4 | 4.5 |
| Porosity, ml./g | 1.72 | 1.50 | 1.43 | 1.39 | 0.99 | 0.86 |
| Distribution peak, A | 450 | 580 | 650 | α730, 1,100 | 1,350 | 1,650 |
| Surface acid strength, Ho | +4.0—+3.3 | −3.0—−5.6 | −3.0—−5.6 | −3.0—−5.6 | | +4.0 |

α The pore-size distribution curve had two peaks.

As is apparent from Table 1, the calcination temperature determines the type of crystals and physical properties of the alumina produced by the calcination.

Figure 5:
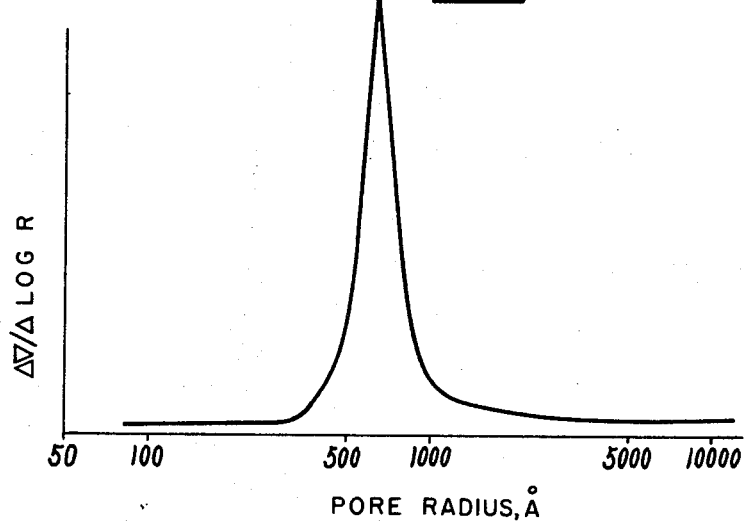
FIGS. 5 and 7 show examples of the pore size distribution chart of θ-alumina produced by the method of the invention.
Figure 6:
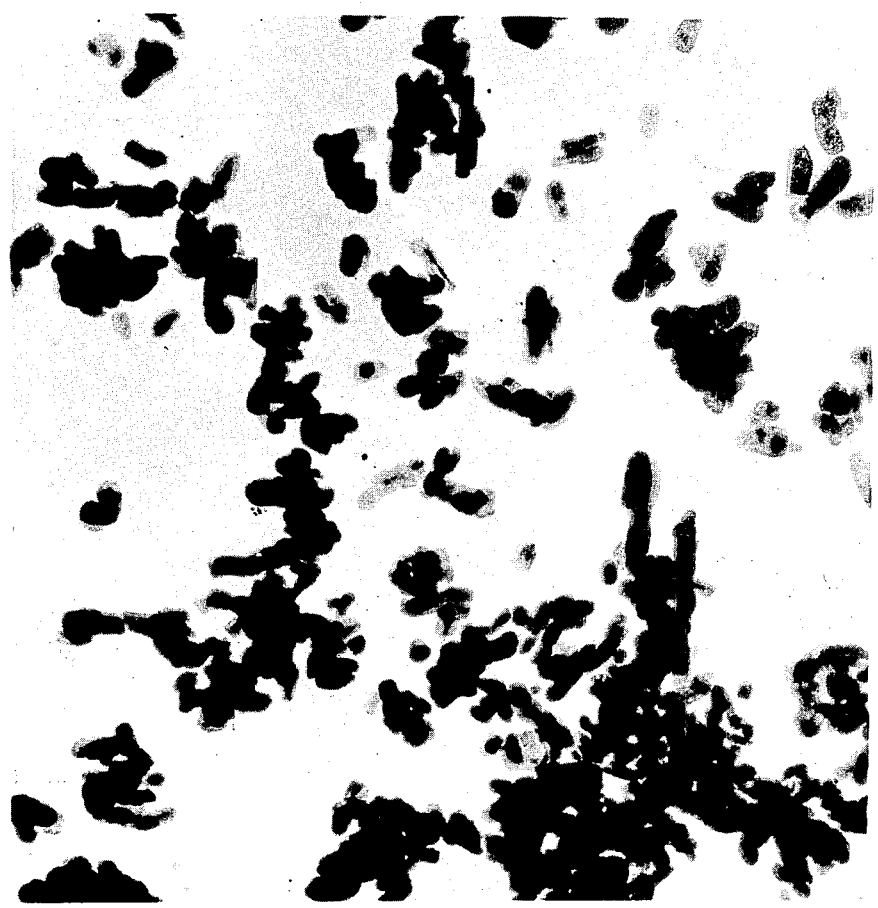
FIG. 6 is a photomicrograph (magnified 30,000 times) taken with the aid of an electron microscope, showing the structure of θ-alumina produced by the method of the invention.

FIG. 4 shows an X-ray diffraction pattern using CuKa radiation, FIG. 5 a pore-size distribution chart, and FIG. 6 an electron-microscopic photograph of a θ-alumina produced by calcination at 1150° C. As is apparent from these figures, the alumina obtained by the method according to the present invention was comprised of uniform crystalline particles, said particles having a narrow pore-size distribution.

EXAMPLE 8

As described in Example 1, a starting aqueous aluminum salt solution was prepared by dissolving 450 g. (1.2 mol) of aluminum nitrate in 1.2 l. of water. An aqueous precipitant solution having a 0.747 N-ammonium ion concentration was prepared by dissolving 170 g. of commercial ammonium carbonate in 5.0 l. of water, and then adding a quantity of Dry Ice thereto until the pH of the solution reached 7.5 due to the absorption of carbon dioxide gas.

The process as described in Example 7 was followed for the preparation of alumina hydrate. The entire reaction solution including the resulting alumina hydrate was transferred to an autoclave made of titanium. Carbon dioxide gas was forced into the autoclave at room temperatures until the pressures shown in Table 2 were attained. Aging was then carried out for 15 hours under stirring at the temperatures shown in Table 2. After the aging was completed, the precipitates were filtered out of the reaction solution, washed with 2 l. of a lukewarm 0.5%-ammonium nitrate solution, dried and then calcined at 350° C. for 4 hours. The resultant alumina hydrate was further calcined at 1150° C. for 2.5 hours whereby an alumina was obtained having physical properties as shown in Table 2.

EXAMPLE 9

A starting aqueous aluminum salt solution was prepared by dissolving 500 g. (1.3 mol) of aluminum nitrate in 1.2 l. of water. An aqueous precipitant solution having an 0.815 N-ammonium ion concentration was prepared by dissolving 186 g. of commercial ammonium carbonate in 5.0 l. of water, and then adding a quantity of Dry Ice thereto until the pH of the solution reached 7.5 due to the absorption of carbon dioxide gas.

This precipitant solution was gradually added to the above-mentioned aqueous aluminum salt solution under vigorous stirring to produce alumina hydrate. An additional 250 ml. of the precipitant solution were added when the viscosity of the reaction solution reached a maximum and the formation of alumina hydrate was completed. The reaction solution had a final pH of 5.62. The total consumption of the aqueous precipitant solution measured 4.82 l.

The entire reaction solution including alumina hydrate was then transferred to an autoclave made of titanium. Carbon dioxide gas was forced into the autoclave until 20-atmospheres pressure was reached. Aging was then carried out at 170° C. under stirring for 40 hours. The pH of the aged reaction solution was 6.70. After the aging was completed the precipitates were filtered out of the reaction solution, washed with 2 l. of a lukewarm 0.5%-ammonium nitrate solution, dried and then calcined at 350° C. for 4 hours whereby 75.2 g. of boehmite were obtained.

The calcination of this boehmite at 1150° C. for 2.5 hours resulted in the production of 63.9 g. of alumina.

Figure 7:
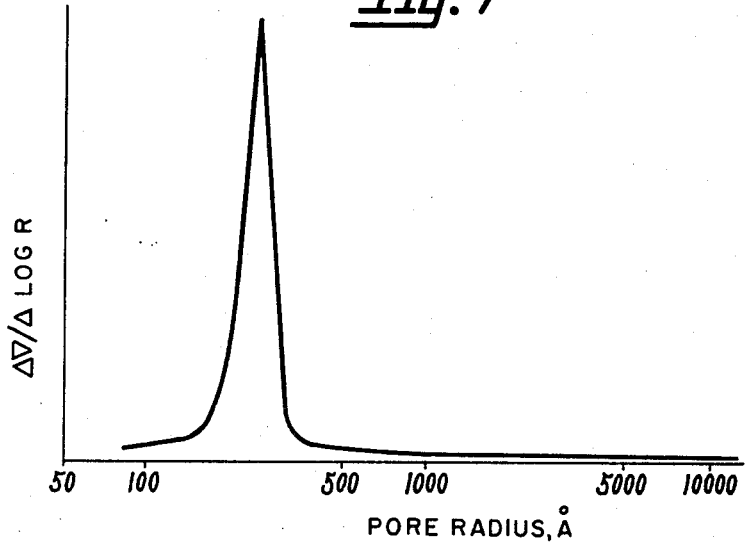

The resulting alumina was determined by X-ray diffraction method to be pure θ-alumina. Said alumina had a bulk density of 0.57 g./ml., a specific surface area of 42.2 m.²/g., and a porosity of 0.70 ml./g. The pore-size distribution of this alumina as shown in FIG. 7 was very narrow.

TABLE 2

| Example | 1 | 2 | 3 | 4 | 5 | 6 |
|---|---|---|---|---|---|---|
| Aging conditions: | | | | | | |
| Temperature, °C | 60 | 150 | 170 | 190 | 210 | 220 |
| CO₂ press., atm | 30 | 20 | 20 | 15 | 10 | 10 |
| pH before aging | 5.4 | 5.25 | 5.6 | 5.4 | 5.5 | 5.55 |
| pH after aging | 5.35 | 5.5 | 6.2 | 6.1 | 5.2 | 6.2 |
| Yield: | | | | | | |
| After calcination at 350° C., g | 67.6 | 66.3 | 66.5 | 68.8 | 68.7 | 67.9 |
| After calcination at 1150° C., g | 58.4 | 57.4 | 57.3 | 58.6 | 58.5 | 57.5 |
| Properties: | | | | | | |
| Crystal form | α— | θ—>>α— | θ— | θ— | θ— | θ—>α |
| Bulk density, g./ml | 1.43 | 0.76 | 0.58 | 0.47 | 0.47 | 0.45 |
| Specific surface area, m.²/g | 6.1 | 52.6 | 49.2 | 34.4 | 30.4 | 20.0 |
| Porosity, ml./g | 0.42 | 0.93 | 1.27 | 1.53 | 1.43 | 1.17 |
| Distribution peak, A | ª 350, 660 | 125 | 180 | 350 | 650 | 650, 1200 |
| Surface acid strength, Ho | −4.0 | −8.2 | −5.6—−8.2 | −3.0—−5.6 | −3.0—−5.6 | −3.0—−5.6 |

ª The pore-size distribution curve had two peaks.

It is apparent from the results obtained, that in order to obtain θ-alumina, it is necessary to age at a temperature of 150° C. to 220° C. The employment of a

EXAMPLE 10

A starting aqueous aluminum salt solution was prepared by dissolving 450 g. (1.2 mol) of aluminium nitrate in 1.20 l. of water. An aqueous precipitant solution having a 0.755 N-ammonium ion concentration was prepared by dissolving 158 g. of commercial ammonium carbonate in 5.0 l. of water, and then adding a quantity of Dry Ice thereto until the pH of the solution reached 7.5 due to the absorption of carbon dioxide gas. This aqueous precipitant solution was gradually added to said starting aqueous aluminium salt solution under vigorous stirring to produce alumina hydrate. When the viscosity of the reaction solution reached a maximum and the formation of alumina hydrate was completed, about 200 ml. of the aqueous precipitant solution were further added to give the reaction solution a final pH of 5.50. The total consumption of the aqueous precipitant solution amounted to 4.96 l.

The entire reaction solution including alumina hydrate was transferred to an autoclave made of titanium. Carbon dioxide gas was forced into the autoclave at room temperatures until 10-atmospheres pressure was reached. The solution was then subjected to aging under stirring at 215° C. for 5 hours. The pH of the aged reaction solution was 6.10.

After the aging was completed, the precipitates were filtered from the reaction solution, washed with a lukewarm 0.5%–ammonium nitrate solution, dried and then calcined at 350° C. for 4 hours whereby 68.9 g. of boehmite were obtained. Alumina was produced by subjecting this boehmite to calcination at 1150° C. for 2.5 hours. The resultant alumina was determined by X-ray diffraction method to be pure $\theta$-alumina. Said $\theta$-alumina had a bulk density of 0.37 g./ml., a porosity of 1.75 ml./g., a very narrow pore-size distribution, a distribution peak of 480 A., and a specific surface area of 30.2 m.$^2$/g.

EXAMPLE 11

A starting aqueous aluminum salt solution was prepared by dissolving 450 g. (1.2 mol) of aluminium nitrate in 1.20 l. of water. An aqueous precipitant solution having a 0.795 N-sodium ion concentration was prepared by dissolving 340 g. of commercial sodium carbonate in 5.0 l. of water, and then adding a quantity of Dry Ice thereto until the pH of the solution reached 7.6 due to the absorption of carbon dioxide gas.

This aqueous precipitant solution was gradually added to the said starting aqueous aluminium salt solution to form alumina hydrate. An additional 240 ml. of the aqueous precipitants solution were added when the viscosity of the reaction solution reached a maximum and the formation of alumina hydrate was completed. The final pH of the reaction solution was 5.62. The total consumption of the aqueous precipitant solution amounted to 4.47 l.

The entire reaction solution including tne alumina nydrate was then transferred to an autoclave made of titanium. Carbon dioxide gas was forced into the autoclave at room temperature until 10-atmospheres pressure was reached. The reaction solution was then subjected to aging under stirring at 200° C. for 5 hours. After the aging, the pH of the reaction solution was 4.75.

After the aging was complete, the precipitates were filtered out of the reaction solution, washed with 4 l. of a lukewarm 0.5%–aluminum nitrate solution, dried and then calcined at 1150° C. for 3 hours whereby 57.7 g. of alumina were obtained.

Its X-ray diffraction pattern indicated that the alumina was comprised of pure $\theta$-alumina. Said $\theta$-alumina had a bulk density of 0.47 g./ml., a specific surface area of 42.2 m.$^2$/g., a sharp pore-size distribution, a distribution peak of 310 A., a porosity of 1.15 ml./g., and contained 0.015% sodium.

EXAMPLE 12

A starting aqueous aluminum salt solution was prepared by dissolving 290 g. (1.2 mol) of aluminium chloride in 1.2 l. of water. An aqueous precipitant solution having a 0.731 N-ammonium ion concentration was prepared by dissolving 150 g. of commercial ammonium carbonate in 5.0 l. of water, and then adding a quantity of Dry Ice thereto until the pH of the solution reached 7.5 due to the absorption of carbon dioxide gas.

This precipitant solution was gradually added to the said starting aqueous aluminium salt solution under vigorous stirring to form alumina hydrate. An additional 200 ml. of precipitant solution were added when the viscosity of the reaction solution reached a maximum and the alumina hydrate formation was completed. The final pH of the reaction solution was 5.23. The total consumption of the aqueous precipitant solution was 4.92 l.

The entire reaction solution including alumina hydrate was then transferred to an autoclave made of titanium. Carbon dioxide gas was forced into the autoclave at room temperatures until 10-atmospheres pressure was reached. The reaction solution was then subjected to aging under stirring at 200° C. for 4 hours. The pH of the aged reaction solution was 5.45.

After the aging was completed, the precipitates were filtered out of the reaction solution, washed with 4 l. of a lukewarm 0.5%–aluminum nitrate solution, dried and then calcined at temperature of 1100° C. for 3 hours whereby 58.5 g. of alumina were obtained. Its X-ray diffraction pattern showed that the resulting alumina was comprised of an $\theta$-alumina. The $\theta$-alumina had a bulk density of 0.30 g./ml., a specific surface area of 43.4 m.$^2$/g., a sharp pore-size distribution, a distribution peak of 180 A. and a porosity of 1.25 ml./g.

COMPARATIVE EXAMPLE 2

Figure 8:
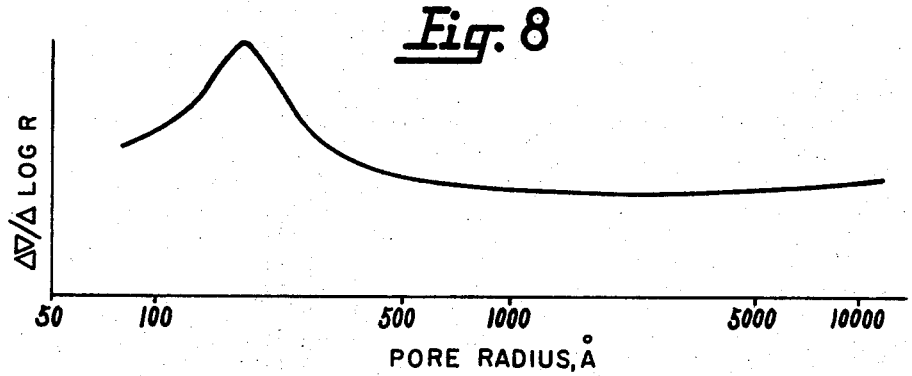
FIG. 8 is a pore size distribution chart of θ-alumina produced by the calcination of commercial bayerite.
Figure 9:
FIG. 9 is a photomicrograph (magnified 30,000 times) taken with the aid of an electron microscope, showing the structure of θ-alumina produced by the calcination of commercial bayerite.

A quantity of commercial bayerite containing 0.44% Na$_2$O, manufactured by Nippon Kagaku Sangyo K.K. was subjected to calcination at 1150° C. for 2.5 hours. Its X-ray diffraction pattern indicated that the resulting alumina was comprised of pure $\theta$-alumina. The $\theta$-alumina had a bulk density of 0.55 g./ml., a specific surface area of 29.7 m.$^2$/g., a pore-size distribution as shown in FIG. 8 and the electron-microscopic structure shown in FIG. 9. As is apparent by reference to these figures, in contrast to the $\theta$-alumina obtained in accordance with the invention, the $\theta$-alumina produced by the calcination of commercial bayerite had a wider pore-size distribution and is comprised of crystalline particles of irregular sizes.

EXAMPLES 13–16

A starting aqueous aluminum salt solution was prepared by dissolving 1.2 mol of an aluminium salt of monobasic acid in 1.2 l. of water. An aqueous precipitant solution was prepared by dissolving a quantity of commercial acid carbonate in 5.0 l. of water, and then adding a quantity of Dry Ice thereto for absorption of carbon dioxide gas until the pH of the solution reached 7.5. The aqueous precipitant solution was gradually added to said aqueous aluminium salt solution under stirring to form alumina hydrate. When the viscosity of the reaction solution reached a maximum, and the formation of alumina hydrate was completed, an additional small quantity of precipitant solution was added to adjust the pH of the reaction solution.

The entire reaction solution was transferred to an autoclave made of titanium. Carbon dioxide gas was forced into the autoclave, and the solution was aged under stirring.

After the aging was completed, the precipitates were filtered out of the reaction solution, washed with 2 l. of a lukewarm 0.5%–ammononium nitrate solution, dried and then calcined at 350° C. for 4 hours whereby a boehmite was obtained.

$\theta$-alumina was produced by subjecting the resulting boehmite to calcination at 1150° C. for 2.5 hours. The conditions under which the $\theta$-alumina was manufactured and the properties thereof are listed in the following Table 3:

Table 5 shows the retention indices computed under said measuring conditions.

TABLE 3

| Example | 13 | 14 | 15[a] | 16[b] |
|---|---|---|---|---|
| Manufacturing conditions: | | | | |
| Starting material | $Al(NO_3)_2$ | $Al(NO_3)_3$ | $AlCl_3$ | $Al(NO_3)_3$ |
| Precipitant | $(NH_4)HCO_3$ | $(NH_4)HCO_3$ | $(NH_4)HCO_3$ | $NaHCO_3$ |
| Aging temp., °C | 170 | 175 | 175 | 175 |
| Aging time, hr | 40 | 45 | 45 | 45 |
| $CO_2$ press., kg./cm.[2] | 20 | 18 | 18 | 18 |
| pH before aging | 5.62 | 5.50 | 5.65 | 5.62 |
| pH after aging | 6.70 | 6.87 | 7.15 | 5.43 |
| Properties: | | | | |
| Crystalform | θ– | θ– | θ– | θ– |
| Bulk density, g./c.cm. | 0.58 | 0.51 | 0.51 | 0.48 |
| Specific surface area, m.[2]/g | 42.2 | 41.3 | 47.8 | 41.7 |
| Porosity, c.cm./g.[c] | 0.70 | 0.93 | 0.83 | 1.00 |
| Distribution peak, A | 270 | 300 | 260 | 280 |

[a] Alumina hydrate calcined at 350° C. contained 0.01% Cl.
[b] Alumina hydrate calcined at 350° C. contained 0.07% Na.
[c] Volume of pores having radius larger than 75 A. measured by means of a mercury porosimeter.

EXAMPLE 17

Figure 10:
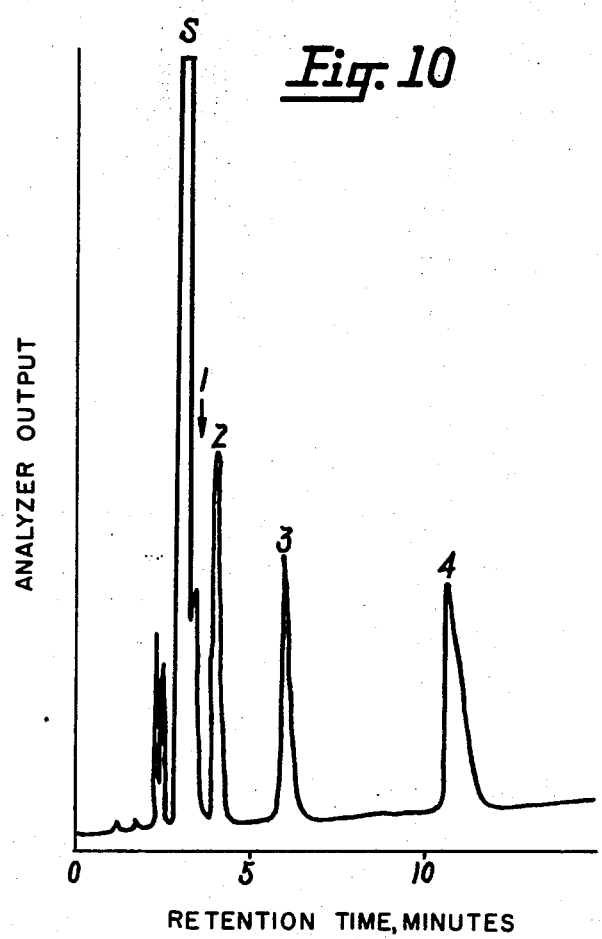

The θ-alumina having a particle size of from 40 to 80 mesh, mentioned under column 1 of Table 3 was charged as is into a column made of stainless steel. Said column had an inner diameter of 3 mm. and a length of 4.5 m. The chromatogram of a 2,2-dimethyl butane solution of a mixture of n-hexane, hexene-1, cyclohexane and benzene was measured at a column temperature of 170° C., a column inlet pressure of 3.0 kg./cm.$^2$, and an outlet-flow volume of 45.0 ml./min. Helium gas was employed as the carrier. The results are shown in FIG. 10. Said FIG. 10 shows the peaks which were obtained. Said peaks are attributable to solvent (S), cyclohexane (1), n-hexane (2), hexene-1 (3), and benzene (4).

It is apparent by reference to FIG. 10 that definite separation of individual ingredients was effected and that fairly symmetrical peaks were obtained. Table 4 shows retention indices computed under the measurement conditions.

TABLE 4

| Hydrocarbon: | Retention index |
|---|---|
| Cyclohexane | 560 |
| n-hexane | 600 |
| Hexene-1 | 670 |
| Benzene | 747 |

These retention indices were computed according to the following equation based on the universal method for representing the gas-chromatography retention index which was proposed by E. Kovatz.

$$I = 200 \times \frac{\log V_R(S) - \log V_R(P_n)}{\log V_R(P_{n+2}) - \log V_R(P_n)} + 100n$$

wherein I denotes retention index, $V_R$ retention volume, S sample and $P_n$ n-paraffin having $n$ carbon atoms.

EXAMPLE 18

The θ-alumina having a particle size of from 40 to 60 mesh, mentioned under column 2 of Table 3 was charged as is into a stainless steel column. The column had a diameter of 3 mm. and a length of 9 m. The chromatogram of a 2,2-dimethyl butane solution of a mixture comprising benzene, toluene, ethylbenzene, m-xylene and p-xylene was measured at a column temperature of 250° C., a column inlet pressure of 3.6 kg./cm.$^2$, and an outlet-flow volume of 33.7 ml./min. Helium was employed as the carrier gas. The results are shown in FIG. 11. Said FIG. 11 shows the peaks which mere obtained. Said peaks are attributable to solvent (S), benzene (1), toluene (2), ethyl benzene (3), m-xylene (4) and p-xylene (5).

It is apparent from FIG. 11 that definite separation of individual ingredients was effected and that even m-xylene and p-xylene which have a similar constitution were definitely separated from one another.

TABLE 5

| Substance: | Retention index |
|---|---|
| Benzene | 751 |
| Toluene | 875 |
| Ethyl benzene | 958 |
| m-xylene | 985 |
| o-xylene | 1073 |
| p-xylene | 1080 |

EXAMPLE 19

The θ-alumina of Example 18 was employed as a packing material for the measurements of the chromatograms of a 2,2-dimethyl butane solution of a mixture consisting of benzene, toluene, ethylbenzene, m-xylene and p-xylene and a 2,2-dimethyl butane solution of a mixture consisting of benzene, toluene, ethylbenzene, m-xylene and o-xylene. The measurements were carried out at the column temperature of 260° C. a column-inlet pressure of 3.0 kg./cm.$^2$, and an outlet flow rate of 21.9 ml./min. Helium was used as the carrier gas.

Figure 13:
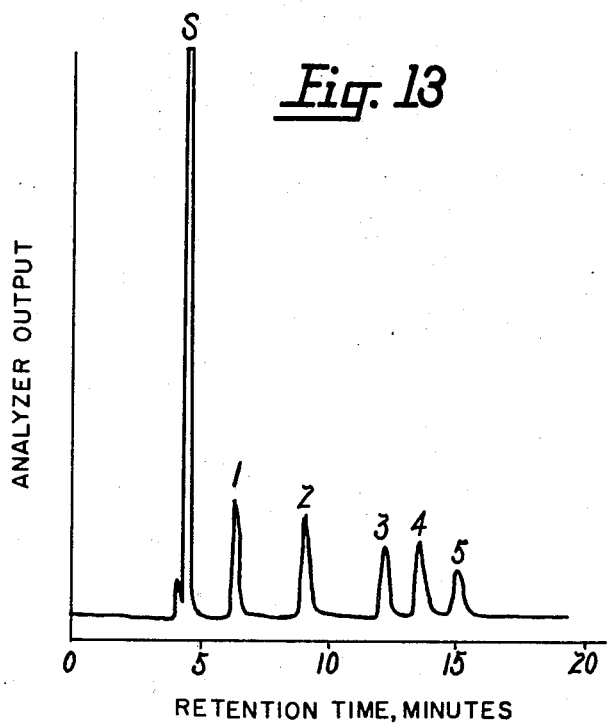

The results are shown in FIGS. 12 and 13. The peaks appearing in FIG. 12 are due to solvent (S), benzene (1), toluene (2), ethylbenzene (3), m-xylene (4), and o-xylene (5) whilst the peaks in FIG. 13 are due to the same ingredients as in FIG. 12 excepting that the reference numeral 5 denotes p-xylene.

EXAMPLE 20

Figure 14:
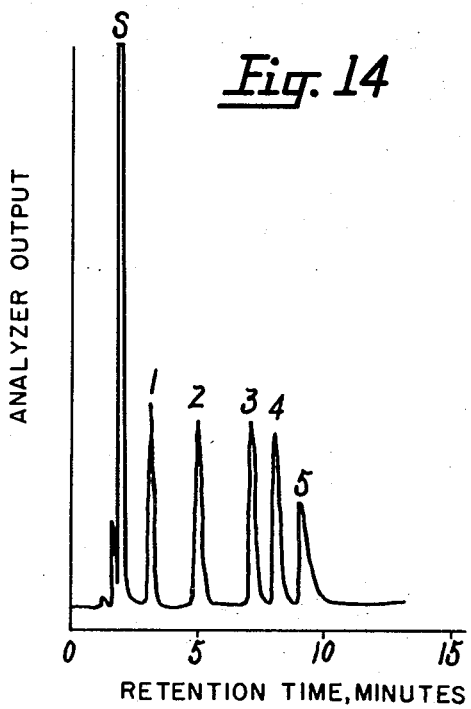

The θ-alumina of Example 15 having a particle size in the range of 40–80 mesh was charged as is into a stainless steel column. The column had an inner diameter of 3 mm. and a length of 4.5 m. The chromatogram of a 2,2-dimethylbutane solution of a mixture consisting of benzene, toluene, ethylbenzene, m-xylene and p-xylene was measured at the inlet pressure of 2.6 kg./cm.$^2$ and an outlet flow rate of 32.8 ml./min. Helium was employed as the carrier gas. The peaks depicted in FIG. 14 are due to solvent (S), benzene (1), toluene (2), ethylbenzene (3), m-xylene (4), and p-xylene (5). As is apparent from FIG. 14, definite separation was effected.

EXAMPLE 21

The θ-alumina of Example 16, the particle size of which was in the range 40–80 mesh, was charged as is into a stainless steel column. The column had an inner diameter of 3 mm. and a length of 4.5 m. The chromatogram of a 2,2-dimethylbutane solution of a mixture consisting of benzene, toluene, ethylbenzene, m-xylene and p-xylene was measured at the column temperature of 240° C., a column inlet pressure of 2.6 kg./cm.$^2$, and an outlet flow rate of 26.7 ml./min. Helium was employed as the carrier gas. The results are shown in FIG. 15. The peaks shown in said FIG. 15 are due to solvent (1), benzene (1), toluene (2), ethylbenzene (3), m-xylene (4), and p-xylene (5). It is apparent from said figure that fairly good separation was effected and that there was good peak symmetry.

COMPARATIVE EXAMPLE 3

Alumina hydrate, obtained under the manufacturing conditions described in Example 14, was calcined at 1250° C. to obtain α-alumina. Said α-alumina had a bulk density of 0.68 g./cc., a specific surface area of 7.0 m.²/g., a porosity of 1.01 cc./g., and a pore-size distribution peak at 1100 A. The α-alumina having particle size in the range 40–80 mesh was charged as is into a stainless steel column. The column had an inner diameter of 3 mm. and a length of 4.5 m.

This column was employed for the measurement of the chromatogram of a 2,2-dimethylbutane solution of benzene, toluene, ethylbenzene, o-xylene, m-xylene and p-xylene. The measurement was made at the column temperature of 170° C. and a column inlet pressure of 3.0 kg./cm.². Helium was used as the carrier gas.

The results are shown in FIG. 16. The peaks shown in said figure are due to solvent (S), benzene (1), toluene (2), ethylbenzene (3), m-xylene, p-xylene (4) and o-xylene (5). It is apparent from said figure that when α-alumina is employed as the packing material, the isomers of xylene are not separated and there is considerable tailing. Moreover, the results obtained are not quantitative and are unsuitable for quantitative analysis.

COMPARATIVE EXAMPLE 4

The same α-alumina of Comparative Example 3 was employed as packing material for the measurement of the chromatogram of a 2,2-dimethylbutane solution of a mixture comprised of n-hexane, cyclohexane, hexene-1 and benzene. The analysis was conducted at the column temperature of 120° C. and the inlet pressure of 3.0 kg./cm.². The result of said analysis showed that no separation was effected due to overlapping of the peaks of n-hexane and cyclohexane onto the peak of the solvent. Further, as noted in Comparative Example 3, there was considerable tailing, and the data obtained was not sufficient for quantitative analysis.

What we claim is:

1. A method for the manufacture of boehmite having pores of uniform radius which comprises treating a solution of an aluminum salt of a monobasic acid selected from the group consisting of aluminum chloride and aluminum nitrate with a solution of an acid carbonate selected from the group consisting of ammonium hydrogen carbonate and sodium hydrogen carbonate to precipitate alumina hydrate gel and then aging the precipitate at a temperature of 150–220° C. whereby a final mixture is obtained having a pH of 4.0–7.5, said aging taking place under the pressure of introduced carbon dioxide, said pH being determined at a room temperature.

2. A method according to claim 1 wherein said pH is 5.5–6.5.

3. A method according to claim 1 wherein said boehmite is, after aging, calcined at a temperature of 1050–1200° C. to produce θ-alumina, said θ-alumina being capable of separating m- and p-xylene.

4. A method according to claim 1 wherein said aging takes place under pressure of 10–20 kg./cm.² of carbon dioxide.

5. A method according to claim 2 wherein said aging takes place under pressure of 10–20 kg./cm.² of carbon dioxide at a temperature of 160° C. to 210° C. for at least 2 hours, said pressure of carbon dioxide being determined at room temperature.

6. A boehmite obtained by the process of claim 1.

7. A method according to claim 3 wherein said aging takes place under pressure of 10–20 kg./cm.² of carbon dioxide at a temperature of 160–210° C. for at least 5 hours, said calcining taking place at a temperature of 1100–1150° C.

8. θ-alumina obtained by the process of claim 3.

9. A column packing material for use in gas chromatography which consists essentially of θ-alumina obtained by the method according to claim 2.

References Cited

UNITED STATES PATENTS

| | | | |
|---|---|---|---|
| 2,406,420 | 8/1946 | Weiser et al. | 23—143 X |
| 2,656,250 | 10/1953 | Thibon et al. | 23—143 |
| 2,762,782 | 9/1956 | Kimberlin et al. | 252—463 |
| 2,894,915 | 7/1959 | Keith | 23—143 X |
| 2,970,891 | 2/1961 | Hinlicky | 23—143 |
| 2,985,007 | 5/1961 | Boeke | 55—67 X |
| 3,057,183 | 10/1962 | De Ford | 55—67 X |
| 3,108,888 | 10/1963 | Bugosh | 23—141 X |
| 3,193,349 | 7/1965 | Mooi | 23—143 |
| 3,264,062 | 8/1966 | Kehl et al. | 23—141 |
| 2,528,751 | 11/1950 | Hunter | 23—143 |
| 3,193,348 | 7/1965 | Mooi | 23—143 |

MILTON WEISSMAN, Primary Examiner

U.S. C. X.R.

423—630, 631